US005784876A

United States Patent [19]

Alkabie

[11] Patent Number: 5,784,876

[45] Date of Patent: Jul. 28, 1998

[54] COMBUSTER AND OPERATING METHOD FOR GAS-OR LIQUID-FUELLED TURBINE ARRANGEMENT

[75] Inventor: Hisham Salman Alkabie, Lincoln, United Kingdom

[73] Assignee: European Gas Turbines Limited, Lincoln, United Kingdom

[21] Appl. No.: 604,675

[22] Filed: Feb. 21, 1996

[30] Foreign Application Priority Data

Mar. 14, 1995 [GB] United Kingdom .................... 9505067

[51] Int. Cl.[6] .................................. F02C 7/18; F23R 3/04

[52] U.S. Cl. ................................ 60/39.06; 60/737; 60/752

[58] Field of Search .................................. 60/39.06, 737, 60/738, 752, 754

[56] References Cited

U.S. PATENT DOCUMENTS

| | | | |
|---|---|---|---|
| 4,008,568 | 2/1977 | Spears et al. | 60/754 |
| 4,205,524 | 6/1980 | Schirmer . | |
| 4,567,730 | 2/1986 | Scott | 60/752 |

FOREIGN PATENT DOCUMENTS

| | | |
|---|---|---|
| 0 624 757 A1 | 11/1994 | European Pat. Off. . |
| 2 328 845 | 5/1977 | France . |
| 2 125 950 | 3/1984 | United Kingdom . |
| 2 176 274 | 12/1986 | United Kingdom . |

*Primary Examiner*—Louis J. Casaregola
*Attorney, Agent, or Firm*—Kirschstein, et al.

[57] ABSTRACT

In a combustor for a gas turbine, combustor 1 utilizes at least 50% of the air supplied thereto by a compressor to mix with the fuel to form a lean mixture, the remainder of the air is utilized for impingement cooling and the spent impingement cooling air is injected as radial jets into a post-primary combustion zone 17 through perforations 6.

11 Claims, 2 Drawing Sheets

COMBUSTER AND OPERATING METHOD FOR GAS-OR LIQUID-FUELLED TURBINE ARRANGEMENT

BACKGROUND OF THE INVENTION

This invention relates to a combustor for a gas- or liquid-fuelled turbine arrangement and a method of operating such a turbine arrangement.

A gas- or liquid-fuelled turbine plant typically includes an air compressor, a combustor and a turbine. The compressor supplies air under pressure to the combustor and a proportion of this air is mixed with fuel in a mixing zone, the mixture being burnt in a primary combustion zone to produce combustion gases to drive the turbine; a further proportion of the air supplied by the compressor is usually utilised to cool the hot surfaces of the combustor.

The proportion of air mixed with the fuel determines the temperature range over which the combustion occurs and will affect the quantity of pollutants, specifically NOx and CO, produced by that combustion. Thus a fuel-rich mixture (i.e. with a comparatively low proportion of air) will burn at comparatively higher temperatures and lead to increased production of NOx and CO. The higher temperatures are detrimental to component life and therefore a large amount of coolant air is required to reduce the temperature downstream of the primary combustion zone.

Mixing more air with the fuel produces a lean mix which burns at a lower temperature and with the production of less pollutants although less coolant air is then available to achieve the cooling necessary for reasonable component life. Hence a lean mix burn carries with it the implication that the limited amount of cooling air which is in consequence available must be utilised in an effective manner.

SUMMARY OF THE INVENTION

According to a first aspect the invention provides a gas- or liquid-fuelled turbine arrangement comprising a combustor, a turbine connected to said combustor and a compressor means connected to said turbine, said compressor means being operative to supply air to said combustor in a first amount for combustion and in a second amount for cooling, said combustor comprising a mixing zone, for the mixing of fuel with said first amount of air, a primary combustion zone downstream of said mixing zone and a post-primary combustion zone downstream of said primary combustion zone, said primary zone and post-primary zone both being contained within a wall of said combustor and containing a flow of combustion gases during operation of said turbine arrangement, said turbine arrangement comprising impingement cooling means for providing impingement cooling of said wall by way of said second amount of air and injection means for allowing an injection of a plurality of cooling jets into said post-primary zone transverse to said combustion gas flow, said compressor means providing a said first amount of air which is at least 50% of said supplied air.

In a preferred arrangement, said injection means comprise a plurality of apertures provided in said wall permitting spent impingement cooling air to provide said cooling jets.

It is preferred that said cooling jets flow radially into said post-primary zone relative to a longitudinal axis of said combustor.

The apertures may be formed with respective tapered lips.

In a preferred arrangement said cooling jets are, in use, at a temperature of at least 700° C., and depending on the circumstances the temperature is at least 800° C.

It is preferred that the turbine arrangement is such that said cooling jets mix with said combustion gases to produce a substantially uniform radial temperature distribution in said post primary zone.

According to a further aspect the invention provides a method of operating a gas- or liquid-fuelled turbine wherein compressed air is supplied to a combustor for combustion and cooling, a first amount of the air supplied to the combustor is mixed with fuel in a mixing zone of the combustor, a second amount of the air supplied to the combustor acts to cool a primary combustion zone wall of the combustor by impingement cooling, the spent impingement cooling air thereafter being directed into a post-primary combustion zone of the combustor downstream of the primary combustion zone, the spent impingement cooling air entering the post-primary combustion zone as jets directed transverse to the flow of combustion gases, and wherein the first amount constitutes at least 50% of the air supplied to the combustor.

BRIEF DESCRIPTION OF THE DRAWINGS

The invention will be described by way of example with reference to the accompanying drawing of which

DETAILED DESCRIPTION OF THE PREFERRED EMBODIMENT

Figure 1:
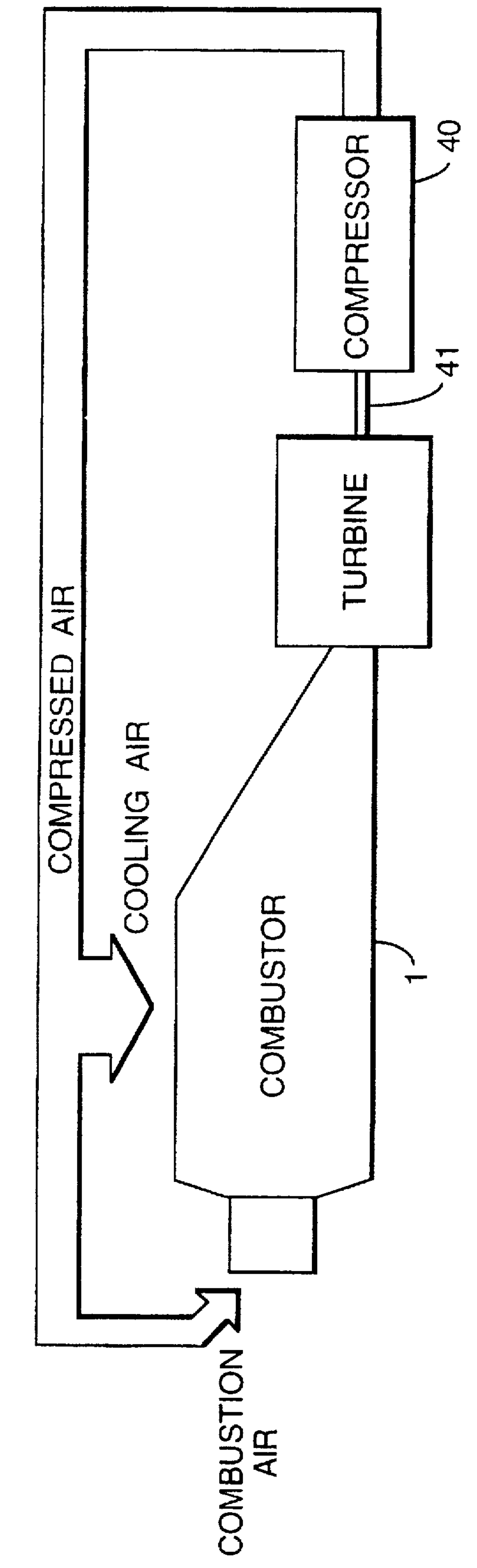
FIG. 1 depicts a turbine plant.

In FIG. 1 the combustor is of a size and configuration determined by the overall design and power requirements of the turbine. There will generally be a plurality of combustors distributed around the turbine axis.

Figure 2:
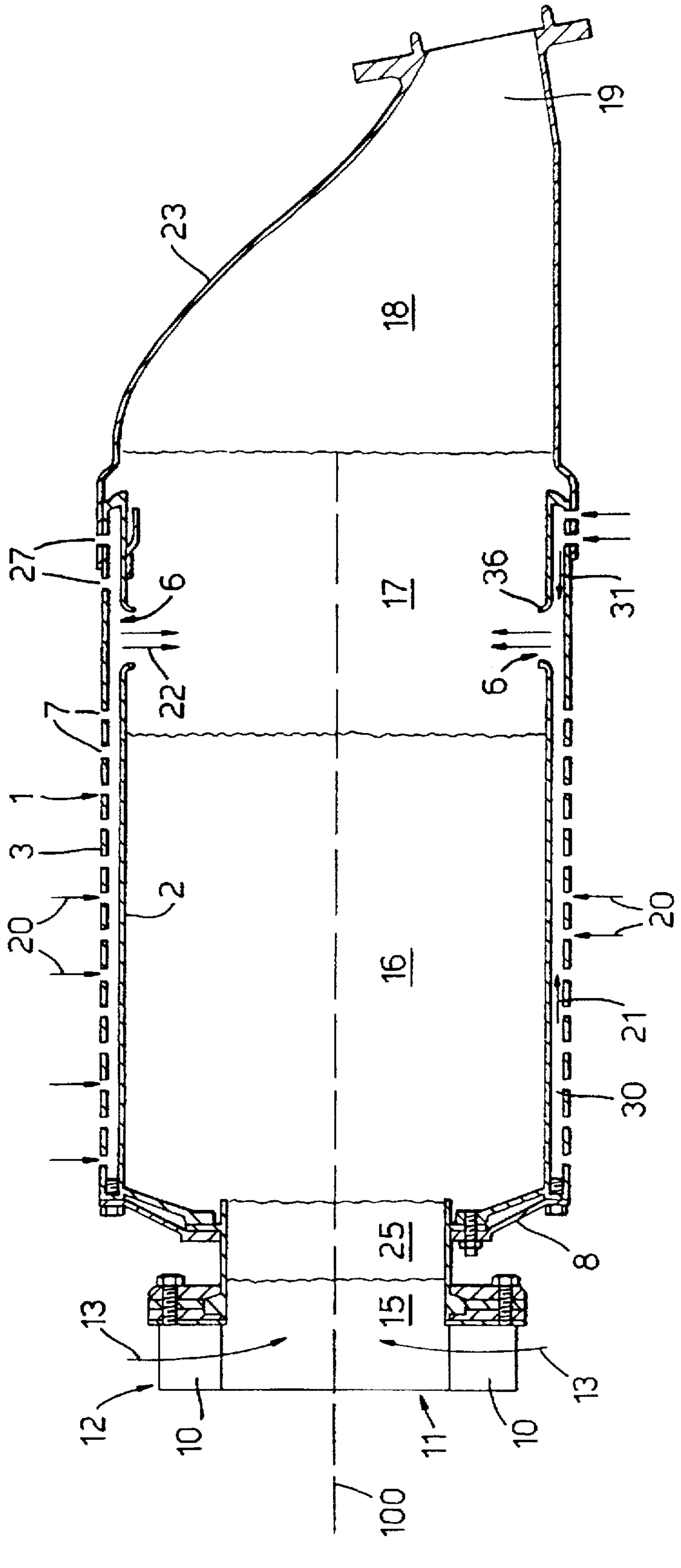
FIG. 2 shows an axial section of a combustor of a gas turbine plant.

As shown and in particular described, the combustor 1 is of generally circular cylindrical or 'can' configuration with the longitudinal axis of the cylinder designated 100 (see FIG. 2). The combustor is one of perhaps four or more mounted in enclosures opening into the turbine casing and distributed uniformly around it. The compressor is driven by a compressor turbine which is exposed to the interior of the combustors and is driven by the combustion gases. The compressor turbine is coupled via a shaft 41 to the compressor stages 40 which supply compressed air to the exterior of the combustor for combustion and cooling.

More particularly (see FIG. 2) each combustor 1 comprises concentric inner and outer cylindrical walls 2, 3. The walls 2, 3 are spaced apart to form an annular space or passage 30 therebetween.

The wall 2 is generally imperforate apart from a plurality of holes or perforations 6 which as shown form an annular array, each hole being formed with a tapered lip 36 to assist in the formation of cooling air jets as will be described subsequently, and also to stiffen wall 2 of the combustor.

The outer wall 3 has a large number of perforations 7, 27 distributed over its surface e.g. in a series of annular arrays or in a helical arrangement. These perforations provide cooling of the inner wall 2 by permitting fine jets of compressed air from the surrounding region to impinge upon the inner wall 2. As shown, perforations 7 are positioned upstream of dilution apertures 6 (as will be explained) and perforations 27 are positioned downstream of aperture 6.

Adjacent the left hand (i.e. upstream) ends of the walls 2, 3 and affixed thereto by a conical duct 8 is a fuel injector assembly 11 with an associated air swirler 12 having a multiplicity of ducts 10 which give the entrained air both radial and circumferential velocity components, the flow of air being broadly as indicated by arrows 13. The region 15 is a mixing zone wherein the air entering through the ducts 10 mixes with fuel injected axially by the fuel injector arrangement. The fuel jets themselves are not illustrated specifically but are commonly mounted in a ring on the back plate. Immediately downstream of the mixing zone is a pre-primary combustion zone 25. Boundaries between the zones are not clear cut and are indicated by wavy lines.

As mentioned previously, the combustor is completely enclosed in a compressed air enclosure so that air enters the combustor through any available aperture, having a combustion or cooling function according to the aperture. In a typical prior art impingement cooled combustor approximately 20% of total air supplied to the combustor might be entrained through the swirler and the remainder utilised for cooling.

However, in the present arrangement a substantially higher proportion of the available air is used for forming the fuel-air mixture so that a very lean fuel-air mixture is formed in zone 15. It is envisaged that at least 50% of the air provided to the combustor is utilised for mixing directly with fuel from the fuel injector 11; a figure of 57% has been found to give highly beneficial results in certain circumstances.

With the fuel/air mixture comprising such a high proportion of the available air supply combustion takes place at a lower temperature than in a conventional combustor and this acts to reduce pollution i.e. leads to reduction in the quantities of CO and NOx produced.

Obviously with such high proportions of air being used for the initial combustion mixture, a lower proportion of air is available for cooling of the combustor. However, since combustion is taking place at a lower temperature this is partly self-balancing, and, moreover, the combustor involves a particularly effective cooling arrangement to make use of the cooling air available as is described below; in addition the cooling air is utilised to 'burn out' CO in the combustion gases as will be explained.

The interior of the combustor 1 downstream from the pre-primary combustion zone 15 comprises in sequence a primary combustion zone 16 extending from the zone 15 to a post-primary combustion zone 17. Beyond the zone 17 is a transition zone 18 in which negligible combustion takes place, leading to the combustor outlet 19, which itself communicates with the inlet to the turbine driven by the combustion gases produced in the combustor 1.

As indicated above it is arranged that at least 50% of the air supplied by the compressor is directly mixed with the fuel in the mixing zones 15 of the various combustors. The remainder of that air flows around the combustor 1. This air has a particular flow arrangement as will now be described. In flowing around and along the outer wall 3 the air passes through the perforations 7, 27 as indicated by arrows 20, and impinges on the inner wall 2. This air thereby effects impingement cooling of the combustor 1, more specifically of the inner wall 2 where it surrounds the primary combustion zone 16 and the post-primary combustion zone 17. The air having entered the annular space 30 between walls 2, 3, flows along as indicated by arrows 21, 31 until it reaches the larger holes 6 in the inner wall 2. As arrows 22 show, the air, i.e.. the spent impingement cooling, air enters zone 17 with considerable force and at high velocity in a series of jets in substantially radial directions relative to the axis 100 i.e. transverse to the flow of combustion gases flowing from zone 16, and in zone 17 this air mixes with these combustion gases. The intermixing of this air with the combustion products flowing to zone 17 from zone 16 in these circumstances tends to produce substantially uniform radial temperature distribution and also ensures a sufficient residence time in zone 17 and to a lesser extent, in transition zone 18 to allow reduction, i.e. burning out of the CO pollutant produced in the combustion process. It is necessary to ensure that the temperature of the spent impingement coolant where it discharges into zone 17 is sufficient to ensure that quenching (i.e. excessive cooling) of the combustion product does not occur otherwise the CO will not be further burnt out. It has been found that this temperature should not be less than 700° C. and ideally should be at least 800° C. To ensure that the spent impingement cooling air enters the zone 17 with sufficient force/velocity and at the appropriate temperature requires careful design of the walls, 2, 3 and perforations 6, 7, 27.

Thus to achieve the desired results i.e. combustion controlled to produce low quantities of pollutants, effective cooling of the combustor, and uniform radial temperature distribution of the combustion products downstream of the primary combustion zone the number, size and positions of the perforations 7 in the outer wall 3 and the entry holes 6 in the inner wall 2 are chosen to suit the particular environment in which the combustor is to operate and to ensure necessary volume and velocity of air entering through perforations 6. The exclusively impingement cooling here described should be contrasted with the more normal cooling arrangement where spent coolant is ejected substantially axially along the interior of the wall 2 of the combustion zone.

The walls 23 defining the transition zone 18 may incorporate a further cooling arrangement if required. The wall is shown as a single wall for convenience but could be double walled or some other arrangement. Film or impingement cooling could then be employed.

I claim:

1. A gas- or liquid-fuelled turbine arrangement comprising a combustor, a turbine connected to said combustor and a compressor means connected to said turbine, said compressor means being operative to supply air to said combustor in a first amount for combustion and in a second amount for cooling, said combustor comprising a mixing zone, for the mixing of fuel with said first amount of air, a primary combustion zone downstream of said mixing zone and a post-primary combustion zone downstream of said primary combustion zone, said primary zone and post-primary zone both being contained within a wall of said combustor and containing a flow of combustion gases during operation of said turbine arrangement, said turbine arrangement comprising impingement cooling means for providing impingement cooling of said wall by way of said second amount of air and injection means for allowing an injection of a plurality of cooling jets into said post-primary zone transverse to said combustion gas flow, said compressor means providing a said first amount of air which is at least 50% of said supplied air.

2. A turbine arrangement according to claim 1, wherein said injection means comprise a plurality of apertures provided in said wall permitting spent impingement cooling air to provide said cooling jets.

3. A turbine arrangement according to claim 2, wherein said cooling jets flow radially into said post-primary zone relative to a longitudinal axis of said combustor.

4. A turbine arrangement according to claim 2, wherein said apertures are formed with respective tapered lips.

5. A turbine arrangement according to claim 2, wherein said cooling jets are, in use, at a temperature of at least 700° C.

6. A turbine arrangement according to claim 5, wherein the temperature is at least 800° C.

7. A method of operating a gas- or liquid-fuelled turbine wherein compressed air is supplied to a combustor for combustion and cooling, a first amount of the air supplied to the combustor is mixed with fuel in a mixing zone of the combustor, a second amount of the air supplied to the combustor acts to cool a primary combustion zone wall of the combustor by impingement cooling, the spent impingement cooling air thereafter being directed into a post-primary combustion zone of the combustor downstream of the primary combustion zone, the spent impingement cooling air entering the post-primary combustion zone as jets directed transverse to the flow of combustion gases, and wherein the first amount constitutes at least 50% of the air supplied to the combustor.

8. A method as claimed in claim 7 wherein the arrangement is such that air entering the post-primary combustion zone is at a temperature of at least 700° C.

9. A method as claimed in claim 8 wherein the temperature is at least 800° C.

10. A turbine arrangement according to claim 2, wherein the number, size and positions of said apertures are selected such that said cooling jets mix with said combustion gases to produce a substantially uniform radial temperature distribution in said post primary zone.

11. A method as claimed in claim 7, wherein the jets of spent impingement cooling air enter the post-primary combustion zone through apertures whose number, size and location are selected such that the jets mix with the combustion gases in the post-primary combustion zone to produce a substantially uniform radial temperature distribution in said post-primary combustion zone.

* * * * *